US008760966B2

(12) United States Patent
Laake et al.

(10) Patent No.: US 8,760,966 B2
(45) Date of Patent: Jun. 24, 2014

(54) JOINT INTERPRETATION OF RAYLEIGH WAVES AND REMOTE SENSING FOR NEAR-SURFACE GEOLOGY

(75) Inventors: Andreas W. Laake, Kingston (GB); Claudio Strobbia, London (GB); Larry Velasco, Copthorne (GB); Ralf G. Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 521 days.

(21) Appl. No.: 12/900,711

(22) Filed: Oct. 8, 2010

(65) Prior Publication Data

US 2011/0085418 A1 Apr. 14, 2011

Related U.S. Application Data

(60) Provisional application No. 61/249,618, filed on Oct. 8, 2009.

(51) Int. Cl.
*G01V 11/00* (2006.01)
*G01V 1/30* (2006.01)

(52) U.S. Cl.
CPC .................................... *G01V 11/00* (2013.01)
USPC ............................................. 367/38; 367/36

(58) Field of Classification Search
USPC .................................. 367/59, 73, 36, 14, 38
See application file for complete search history.

(56) References Cited

U.S. PATENT DOCUMENTS 3,703,133 A 11/1972 Yost, Jr.
4,698,759 A 10/1987 Eliason et al.
5,053,778 A 10/1991 Imhoff
5,321,613 A * 6/1994 Porter et al. ..................... 702/1
5,671,136 A 9/1997 Willhoit, Jr.
5,781,503 A 7/1998 Kim
5,905,657 A 5/1999 Celniker
5,987,388 A 11/1999 Crawford et al.
6,016,461 A 1/2000 Thore
6,028,819 A 2/2000 Mullarkey et al.
6,035,255 A 3/2000 Murphy et al.
6,597,992 B2 7/2003 Rooney et al.
6,665,617 B2 12/2003 Shobayashi (Continued)

FOREIGN PATENT DOCUMENTS

CN 1387051 A 12/2002
WO 2005119298 A3 12/2005

OTHER PUBLICATIONS

Al-Juaidi et al, "Merged remotely sensed data for geomorphological investigations in deserts: examples from Central Saudi Arabia", The Geographical Journal, vol. 169, No. 2, Jun. 2003, pp. 117-130.*

(Continued)

*Primary Examiner* — Ian J Lobo

(57) ABSTRACT

A computer implemented technique for use in seismic data interpretation and, more particularly, with respect to near-surface geological structures, includes a computer-implemented method, including: jointly interpreting a plurality of complementary data sets describing different attributes of a near-surface geologic structure; and ascertaining a near-surface geomorphology from the joint interpretation. In another aspect, the technique includes a program storage medium encoded with instructions that, when executed, perform such a method. In yet another aspect, the method includes a computing apparatus programmed to perform such a method.

17 Claims, 8 Drawing Sheets
(4 of 8 Drawing Sheet(s) Filed in Color)

(56) References Cited

U.S. PATENT DOCUMENTS

| | | | |
|---|---|---|---|
| 6,686,917 | B2 | 2/2004 | Tarr |
| 6,885,947 | B2 | 4/2005 | Xiao et al. |
| 7,031,838 | B1 | 4/2006 | Young et al. |
| 7,218,573 | B1 | 5/2007 | Laake |
| 7,330,799 | B2 | 2/2008 | Lefebvre et al. |
| 7,408,836 | B2 | 8/2008 | Muyzert et al. |
| 7,483,917 | B2 | 1/2009 | Sullivan et al. |
| 8,509,027 | B2 | 8/2013 | Strobbia et al. |
| 2003/0083819 | A1 | 5/2003 | Rooney et al. |
| 2003/0198404 | A1 | 10/2003 | Frisken et al. |
| 2005/0086227 | A1 | 4/2005 | Sullivan et al. |
| 2005/0114031 | A1 | 5/2005 | Thambynayagam et al. |
| 2005/0157589 | A1 | 7/2005 | Laake |
| 2005/0171700 | A1 | 8/2005 | Dean |
| 2006/0036367 | A1 | 2/2006 | Brewster |
| 2006/0136162 | A1 | 6/2006 | Hamman et al. |
| 2007/0195645 | A1 | 8/2007 | Laake |
| 2008/0040349 | A1 | 2/2008 | Rahmes et al. |
| 2008/0195321 | A1 | 8/2008 | Levin |
| 2008/0294393 | A1 | 11/2008 | Laake et al. |
| 2009/0122645 | A1 | 5/2009 | Guigne et al. |
| 2009/0161488 | A1 | 6/2009 | Ferber et al. |
| 2010/0091611 | A1 | 4/2010 | Laake |
| 2010/0119118 | A1 | 5/2010 | Laake |
| 2010/0128563 | A1 | 5/2010 | Strobbia et al. |
| 2011/0085418 | A1 | 4/2011 | Laake |
| 2011/0120724 | A1 | 5/2011 | Krohn |

OTHER PUBLICATIONS

Zoran, M., "Data Fusion technique for analysis of Vrancea seismic region, Romania", Proc. of SPIE vol. 5239 (SPIE, Bellingham, WA, 2004).*

Laake, et al., Integrated Approach to 3D Near-Surface Characterization, 70th EAGE Conference and Exhibition Incorporating SPE, Jun. 2008, Paper D033.*

Laake, et al., Integration of Remote Sensing Data with Geology and Geophysics—Case study from Bahrain, GEO 2006.*

Bennett, Geoff. "3-D seismic refraction for deep exploration targets." The Leading Edge 18.2 (1999): 186-191.*

PCT Search Report, dated May 30, 2011, Application No. PCT/US2010/051969.

Taner, M. T., Koehler, F., and Alhilali, K. A., "Estimation and Correction of Near-Surface Time Anomalies," Geophysics, Aug. 1974, vol. 39(4): pp. 441-463.

Palmer, D., "An Introduction to the Generalized Reciprocal Method of Seismic Refraction Interpretation," Geophysics , Nov. 1981, vol. 46(11): pp. 1508-1518.

Rotham, D., "Automatic Estimation of Large Residual Statics Corrections," Geophysics, Feb. 1986, vol. 51(2): pp. 332-334.

Zhu, X., Sixta, D. P., and Angstman, B. G., "Tomostatics: Turning-Ray Tomography and Static Corrections," The Leading Edge, Dec. 1992, vol. 11(12): pp. 15-23.

Marsden, D., "Static Corrections—A Review, Part 1," The Leading Edge, Feb. 1993, vol. 12: pp. 43-49.

Marsden, D., "Static Corrections—A Review, Part 2," The Leading Edge, Feb. 1993, vol. 12: pp. 115-120.

Marsden, D., "Static Corrections—A Review, Part 3," The Leading Edge, Feb. 1993, vol. 12: pp. 210-216.

Harris, R., Cooper, M., and Shook, I., "Focusing Oil and Gas Exploration in Eastern Yemen by Using Satellite Images and Elevation Data Alongside Conventional 2D Seismic," CSEG Recorder, Feb. 2003: pp. 31-34.

Insley, M., and Laake, A., "Seismic Quality Analysis in Algeria: Application of Earth Observation Data Sets to Oil & Gas Exploration," PESGB London Evening Meeting, 2003.

Pfleiderer et al, "Visualization of Vienna's Subsurface," SPE 65132, Offshore Europe Proceedings, Feb. 2004: pp. 1-6.

Insley, M., and Laake, A., "Satellite Based Seismic Technology, Case Study: Berkine Basin , Algeria," 66th EAGE Conference and Exhibition, Jun. 2004, Paris, France.

Laake, A., and Insley, M., "Applications of Satellite Imagery to Seismic Survey Design," The Leading Edge, Oct. 2004, vol. 23: pp. 1062-1064.

Laake, A., and Tewkesbury, A., "Vibroseis Data Quality Estimation from Remote Sensing Data," EAGE 67th Conference and Exhibition, Jun. 2005, Madrid Spain.

Laake, A., "Application of Landsat Data to Seismic Exploration—Case Study from Kuwait," Kuwait First International Remote Sensing Conference and Exhibition, Sep. 2005.

Bubeqi, L., Kaculini, S., Bendjaballah, M., Bambrick, J., "Improving Structural Interpretation Using Modern Techniques for Solving Complex Problems: From Near Surface Anomalies to Pre Stack Depth Migration—Block 32 Yemen," 2005 CSEG National Convention: pp. 57-60.

Laake, A., and Cutts, A., "The Role of Remote Sensing Data in Near Surface Seismic Characterization," First Break, Feb. 2007, vol. 25: pp. 61-65.

Taner, M. T., Berkhout, A. J., Treitel, S., and Kelamis, P. G., "The Dynamics of Statics," The Leading Edge, Apr. 2007, vol. 26(4): pp. 396-402.

Cutts, A., and Laake, A., "Vibrator Data Quality Prediction from Remote Sensing-Based Near-Surface Analysis," Paper B005, 70th EAGE Conference and Exhibition, Rome, Italy, Jun. 2008: pp. 1-5.

Marion et al., "SPE 65132: Constraining 3D static models to seismic and sedimentological data: a further step towards reduction of uncertainties," SPE International, 2000: pp. 1-6.

International Search Report and Written Opinion of PCT Application No. PCT/US2008/064357 (14.0365 PCT) dated Sep. 2, 2008: pp. 1-13.

Laake, A., Strobbia, C., and Cutts, A., "Integrated Approach to 3D Near Surface Characterization in Desert Regions," First Break, Nov. 2008, vol. 26: pp. 109-112.

Ferber, R., Velasco, L., West, L., "Interferometric Rayparameter Estimation and Applications," Paper V001, EAGE Conference, Jun. 2009: pp. 1-5.

Laake, A., Zaghloul, A., Strobbia, C., "Geomorphology—Understanding the Near-Surface Impact on Seismic Data," 71st EAGE Conference and Exhibition, EAGE Workshop 10, Jun. 2009.

International Search Report and Written Opinion for PCT Application No. PCT/US2009/059250 (53.0116-PCT) dated May 14, 2010.

Strobbia et al., First Break, Near Surface Geoscience, Surface waves: processing, inversion and removal, vol. 28, Aug. 2010 (7 pages).

Laake, Andreas, Earth and Environmental Sciences, Integration of Satellite Imagery,Geology and Geophysical Data, 2011 (26 pages).

Lijuan et al., A New Technology of Optimizing Survey Design on Real-Surface Model, 2008 (6 pages).

Morgan, Chris, Developing a Seismic Viewer Extension for ArcMap, ESRI Petroleum User Group Conference, 2005 (20 pages).

Shaohua, Zhang, Applying 3D seismic in a complex mountainous area of Tarim Basin, The Leading Edge—Sep. 2002 (3 pages).

1 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—Foreword (10 pages).

2 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—1.Introduction: Regional Landforms Analysis (31 pages).

3 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—2. Tectonic Landforms (T-1-30) (104 pages).

4 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—2. Tectonic Landforms (T-31-61) (95 pages).

5 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—3. Volcanic Landforms (95 pages).

6 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—4. Fluvial Landforms (87 pages).

(56) References Cited

OTHER PUBLICATIONS 7 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—5. Deltaic Landforms (53 pages).
8 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—6. Coastal Landforms (75 pages).
9 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—7. Karst Landforms and Lakes (56 pages).
10 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—8. Eolian Landforms (99 pages).
11 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—9. Glaciers and Glacial Landforms (105 pages).
12 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—10. Planetary Landforms (52 pages).
13 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—11. Geomorphological Mapping (22 pages).
14 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—12. Global Geomorphology: Outlook for the Future (19 pages).
15 of 15—Short, Sr., N. M., and Blair, Jr., R. W., (eds.) Geomorphology from Space, NASA, 1986, URL: http://geoinfo.amu.edu.pl/wpk/geos/GEO_COMPLETE_TOC.html—Epilogue, Appendix, and Index (54 pages).
Barmin, M. P., Ritzwoller, M. H. and Levshin, A. L., "A Fast and Reliable Method for Surface Wave Tomography", Pure and Applied Geophysics, Aug. 2001, vol. 158(8): pp. 1351-1375.
Bensen, G. D., Ritzwoller, M. H., Barmin, M. P., Levshin, A. L., Lin, F., Moschetti, M. P., Shapiro, N. M. and Yang, Y., "Processing seismic ambient noise data to obtain reliable broad-band surface wave dispersion measurements", Geophysical Journal International, 2007, vol. 169: pp. 1239-1260.
Bohlen, T., Kugler, S., Klein, G., and Theilen, F., "1.5D inversion of lateral variation of Scholte-wave dispersion", Geophysics, 2004, 69(2): pp. 330-344.
Grandjean, G., Bitri, a., "2M-SASW: Multifold Multichannel Seismic Inversion of Local Dispersion of Rayleigh Waves in Laterally Heterogeneous Subsurfaces: Application to the Super-Sauze Earthflow, France", Near Surface Geophysics, Dec. 2006, vol. 4(6): pp. 367-375.
Hayashi, K. and Suzuki, H., "CMP Cross-Correlation Analysis of Multi-Channel Surface-Wave Data", Exploration Geophysics, 2004, 35(1): pp. 7-13.
McMechan, G. A., and Yedlin, M. J., "Analysis of Dispersive Wave by Wave Field Transformation", Geophysics, Jun. 1981, vol. 46(6): pp. 869-874.
Ross, W. S., Lee, S., Diallo, M. S., Johnson, M. L., Shatilo, A. P., Anderson, J. E., Martinez A., Characterization of Spatially Varying Surface Waves in a Land Seismic Survey, SEG Technical Program Expanded Abstracts, 2008: pp. 2556-2560.
Schmidt, R. O., "Multiple Emitter Location and Signal Parameter Estimation", IEE Transactions on Antennas and Propagation, Mar. 1986, vol. 34(3): pp. 276-280.
Shapiro, N. M., Campillo, M., Stehly, L., Ritzwoller, M. H., High Resolution Surface-Wave Tomography from Ambient Seismic Noise, Science, Mar. 2005, 307 (5715), pp. 1615-1618.
Sobel, "Spatial Differentiation—3 x 3 Window Table," Pattern Classification and Scene Analysis, John Wiley & Sons: New York, eds. Duda et al., 1973: pp. 271-272.
Socco, L.V. and Strobbia, C., Surface-wave method for near-surface characterization: tutorial, Near Surface Geophysics, Nov. 2004, vol. 2(4): pp. 165-185.
Strobbia, C. And Foti, S., "Multi-offset phase analysis of surface wave data (MOPA)", Journal of Applied Geophysics, Aug. 2006, vol. 59(4): pp. 300-313.
Xia, J., Miller, R. D., and Park, C. B., "Estimation of Near-Surface Shear-Wave Velocity by Inversion of Rayleigh Waves", Geophysics, May 1999, 64(3), pp. 691-700.

* cited by examiner

JOINT INTERPRETATION OF RAYLEIGH WAVES AND REMOTE SENSING FOR NEAR-SURFACE GEOLOGY

CROSS-REFERENCE TO RELATED APPLICATIONS

This application claims priority to U.S. Provisional Patent Application No. 61/249,618 filed on 8 Oct. 2009 and entitled "Joint Interpretation of Rayleigh Waves and Remote Sensing for Near-Surface Geology", the content of which is hereby incorporated by reference.

The patent or application file contains at least one drawing executed in color. Copies of this patent or patent application publication with color drawing(s) will be provided by the Office upon request and payment of the necessary fee.

STATEMENT REGARDING FEDERALLY SPONSORED RESEARCH OR DEVELOPMENT

Not applicable.

BACKGROUND OF THE INVENTION

1. Field of the Invention

The presently invention pertains to seismic data interpretation and, more particularly, with respect to near-surface geological structures.

2. Description of the Related Art

This section of this document introduces various aspects of the art that may be related to various aspects of the present invention described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as admissions of prior art.

Much effort is expended in locating, evaluating, and exploiting hydrocarbon deposits, e.g., oil and natural gas, trapped in subterranean geological formations. The exercise of examining subterranean geological formations for deposits of hydrocarbon deposits is known as "seismic surveying" or, sometimes, "geophysical surveying". It is highly desirable to locate hydrocarbon deposits in reservoirs in the subsurface from which liquid or gas can be extracted or into which liquid or gas can be injected.

A seismic survey typically involves deploying seismic source(s) and seismic sensors at predetermined locations. The sources generate seismic waves which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected waves, the sensors generate electrical signals to produce seismic data. Analysis of the seismic data can then indicate the presence or absence of probable locations of hydrocarbon deposits.

The correlation of surface geomorphology with subsurface geology is well known. Huggett, R. J. *Fundamentals of Geomorphology* (2nd ed., Routledge Fundamentals of Physical Geography, Routledge, London 2007). Shallow geologic formations, or "near-surface geological structures", are therefore of interest. Those in the art will appreciate that the term "near-surface" is a term of art commonly used and well understood in the art. They can therefore identify those geological structures that are "near-surface" and those that are not.

Near-surface geological structures present particular problems not encountered with deeper formations. Mapping near-surface geological structures with seismic data acquired by state-of-the-art receiver arrays is often compromised by noise resulting from near-offset source noise and seismic near-field effects up to the degree that the data cannot be used for shallow structural mapping at all. In cases where the data is noisy but usable, conventional techniques addressing this problem using a variety of processing techniques that remove noise from the data prior to interpreting the data. However, the industry continues to seek better approaches to this problem.

The present invention is directed to resolving, or at least reducing, one or all of the problems mentioned above.

SUMMARY OF THE INVENTION

The present invention includes a computer implemented technique for use in seismic data interpretation and, more particularly, with respect to near-surface geological structures. In a first aspect, the technique includes a computer-implemented method, comprising: jointly interpreting a plurality of complementary data sets describing different attributes of a near-surface geologic structure; and ascertaining a near-surface geomorphology from the joint interpretation. In another aspect, the technique includes a program storage medium encoded with instructions that, when executed, perform such a method. In yet another aspect, the method includes a computing apparatus programmed to perform such a method.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
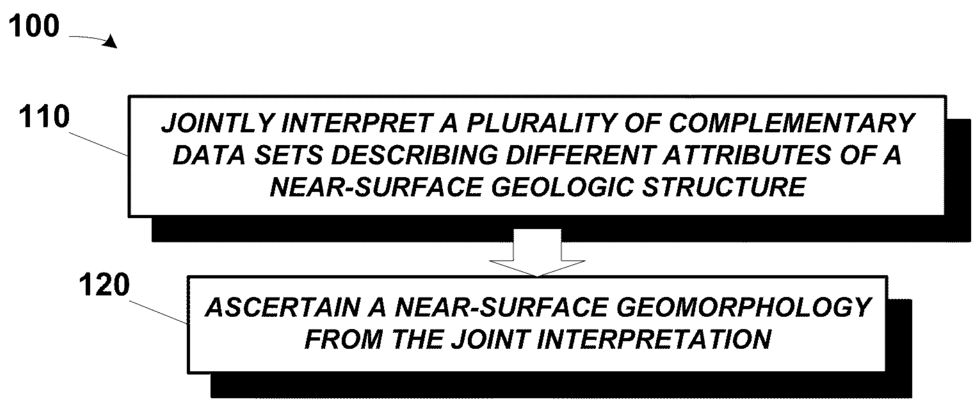
FIG. 1 illustrates a computer-implemented method in accordance with one particular embodiment of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The mapping of near-surface geological structure and the drilling risks resulting from it are a challenge that requires a combination of techniques, because state-of-the-art seismic using receiver arrays does not provide sufficient data quality to interpret the data for geology. The presently disclosed technique jointly interprets complementary data sets that describe different attributes of the same near-surface geologic structures. When interpreted jointly, one can then ascertaining a near-surface geomorphology from the joint interpretation More particularly, in the illustrative embodiment, the presently disclosed technique integrates fault outcrop mapping using satellite image interpretation with seismic near-surface characterization techniques from Rayleigh wave and refraction velocity mapping. The interpretation of satellite images and digital elevation models yields a model of the surface geomorphology, which can be studied for anomalies.

Linear anomalies are associated with fault outcrops, whereas areal anomalies are interpreted as possible imprint of subsurface geological structure. The interpretation of a Rayleigh wave and P-wave velocity cube extracted from a point receiver seismic cube, as in the embodiments illustrated below, allows the extraction of iso-velocity surfaces, which can be studied for anomalies, too. Linear anomalies such as local sudden drop in velocity are associated with near-surface faults whereas local highs of the iso-velocity surfaces are interpreted as near-surface imprint of deeper reservoir structures.

The combination of three different methods, remote sensing and P-wave and S-wave seismic, meets the overarching goal of extracting complementary data sets, which describe different attributes of the same near-surface geologic structures. Remote sensing provides dense spatial mapping of minerals and geologic structures, but it lacks penetration into the subsurface. Seismic data provide elastic information about the structures in the near-surface, but need to be converted into geologically meaningful data on one hand and spatially sparse data on the other hand. The integration of the three data types optimizes the geological description of the near-surface through compensating the weaknesses in one data type by the strength in another data set.

The present invention will now be described with reference to the attached drawings. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

This presently disclosed technique includes, in one particular aspect, a computer-implemented method for mapping shallow geological structure and related drilling risks through full integration of surface and subsurface geophysical data with remote sensing data. As is illustrated in FIG. 1, the computer-implemented method (100) comprises first jointly interpreting (at 110) a plurality of complementary data sets describing different attributes of a near-surface geologic structure; and ascertaining (at 120) a near-surface geomorphology from the joint interpretation.

Figure 2:
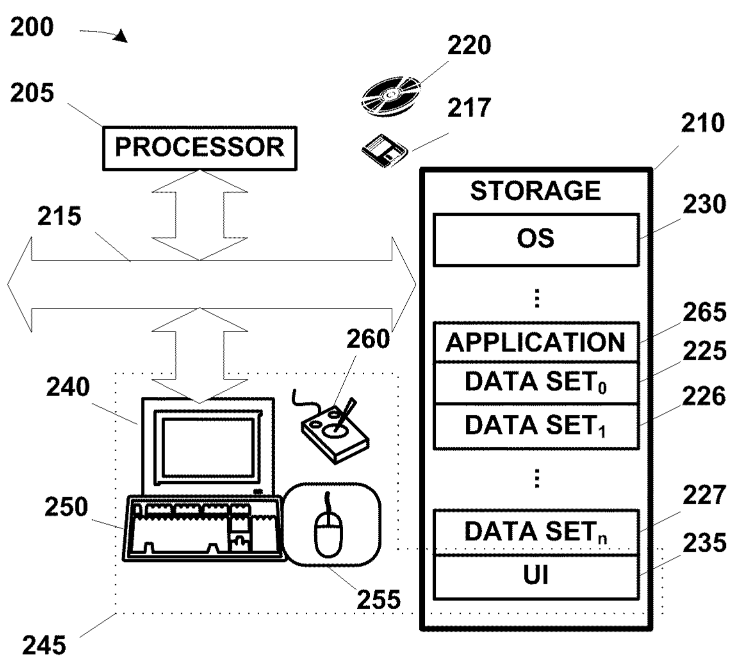
FIG. 2 shows selected portions of the hardware and software architecture of a computing apparatus such as may be employed in some aspects of the present invention.

The computer-implemented method 100 of FIG. 1 may be performed on any appropriately programmed computing system. FIG. 2 shows selected portions of the hardware and software architecture of a computing apparatus 200 such as may be employed in some aspects of the present invention. The computing apparatus 200 includes computing device, such as a processor 205, communicating with storage 210 over a bus system 215. The storage 210 may include a hard disk and/or random access memory ("RAM") and/or removable storage such as a floppy magnetic disk 217 or an optical disk 220.

The storage 210 is encoded with a plurality of complementary data sets 225-227 describing different attributes of a near-surface geologic structure. The seismic data sets 225-227 are acquired in a manner specific to the type of data but in a manner that will be apparent to those skilled in the art having the benefit of this disclosure. Typically, the data will have been previously acquired in both time and place, and it may therefore be what is known as "legacy" data in some embodiments.

The storage 210 is also encoded with an operating system 230, user interface software 235, and an application 265. The user interface software 235, in conjunction with a display 240, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. The application 265, when invoked, performs the method of the present invention. The user also may invoke the application in conventional fashion through the user interface 245.

Those in the art will appreciate that the data sets comprise sets of ordered data physically manifested as digital patterns of electromagnetic bits coded on an underlying program storage medium of some kind. The data may be rendered in some particular manner. For example, it may be rendered for human perception either through display or printing. The data is shown rendered for human perception throughout this disclosure, but there is no requirement that such be the case. Some embodiments may process the data without ever rendering it.

Figure 3:
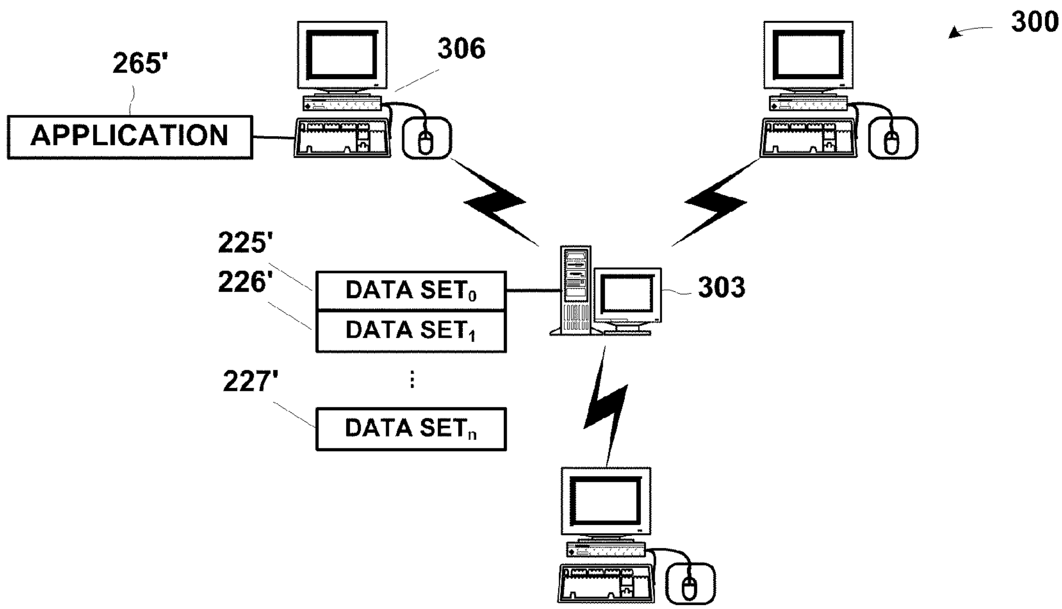
FIG. 3 illustrates a computing system on which some aspects of the present invention may be practiced in some embodiments.

Note that there is no need for the data sets 225-227 to reside on the same computing apparatus 200 as the application 265 by which they are processed. Some embodiments of the present invention may therefore be implemented on a computing system, e.g., the computing system 300 in FIG. 3, comprising more than one computing apparatus. For example, the data sets 225'-227' may reside in data structures residing on a server 303 and the application 265' by which they are processed on a workstation 306 where the computing system 300 employs a networked client/server architecture. Furthermore, although the data sets 225'-227' are shown residing on the server 303, there is no requirement that they reside together. They may be distributed across the computing system 300 in any convenient manner.

However, there is no requirement that the computing system 300 be networked. Alternative embodiments may employ, for instance, a peer-to-peer architecture or some hybrid of a peer-to-peer and client/server architecture. The size and geographic scope of the computing system 300 is not material to the practice of the invention. The size and scope may range anywhere from just a few machines of a Local Area Network ("LAN") located in the same room to many hundreds or thousands of machines globally distributed in an enterprise computing system.

As is apparent from this discussion, some portions of the detailed descriptions herein presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 4:
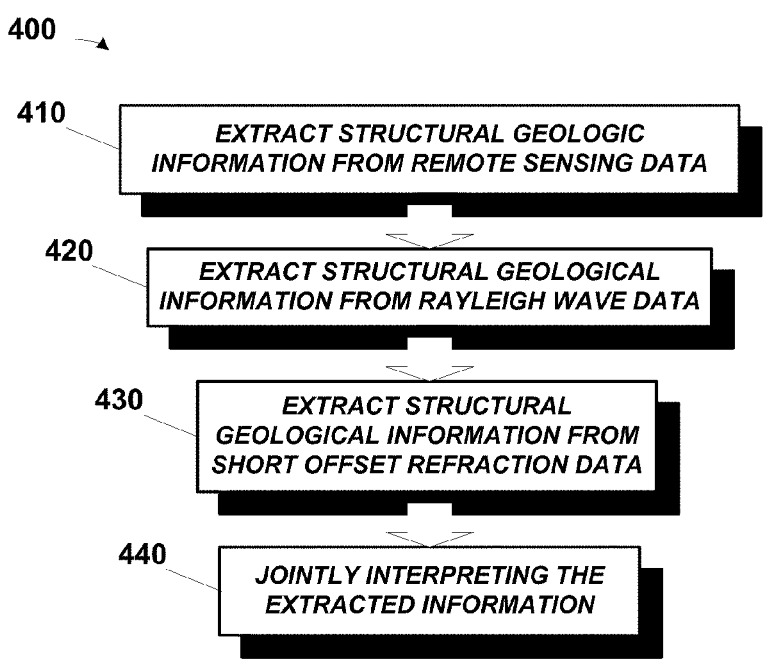
FIG. 4 illustrates a larger computing system on which some aspects of the present invention may be practiced in some embodiments.

Returning now to FIG. 1, as those in the art having the benefit of this disclosure will appreciate, the joint interpretation (at 110) and ascertainment (at 120) will be implementation specific depending upon the nature of the data employed. To further an understanding of the present invention, one particular embodiment will now be discussed in which the data sets comprise a set of remotely sensed data, a set of short offset data, and a set of Rayleigh wave data. The method in this particular embodiment may be represented as illustrated in FIG. 4, in which the method 400 comprises: extracting (at 410) structural geologic information from sensing data; extracting (at 420) structural geologic information from Rayleigh wave data; extracting (at 430) structural geologic information from short offset refraction data; and jointly interpreting (at 440) the extracted information. Although FIG. 4 illustrates the three extractions (at 410-430) sequentially, they may be performed in parallel in some embodiments.

Turning now to the extraction (at 410, FIG. 4) of structural geologic information from sensing data, the fundamentals of mapping surface geomorphology using satellite data are known. See, e.g., Short, N. M. Sr., and R. W. Jr. Blair (eds.), "Geomorphology from Space", http://geoinfo.amu.edu.pl/wpk/geos/GEO_COMPLETE_TOC.html (1986) (downloaded Sep. 19, 2007); Sabins, F., *Remote Sensing, Principle and Interpretation* (W.H. Freeman & Co, New York. N.Y. 3rd Ed. 1996). The interpretation of remote sensing data for geophysical near-surface properties was first introduced for the purpose of seismic survey design in Laake, A. and Insley, M., "Applications of Satellite Imagery to Seismic Survey Design," *The Leading Edge* 1062-1064 (October 2004).

The integration of remote sensing with geology and geophysics was then demonstrated in Laake, A., Al-Alawi, H. and Gras, R., "Integration of Remote Sensing Data with Geology and Geophysics—Case Study from Bahrain", *GEO* (2006). Finally, remote sensing data were used in the generation of a near-surface geologic model in Laake, A., & Cutts, A., "The Role of Remote Sensing Data in Near-Surface Seismic Characterization", 25(2) *First Break* 51-55 (2007); Laake, A., et al., "Integrated Approach to 3D Near Surface Characterization in Desert Regions", 26 *First Break* 109-112 (2008); and Laake, A., et al., "Geomorphology—Understanding the Near-Surface Impact on Seismic Data", presented at EAGE workshop, 71st EAGE Conference and Exhibition, Amsterdam, The Netherlands, 8-11 (June 2009).

The geological interpretation of remote sensing data is based on the extraction of geomorphologic information using the digital elevation model and its spatial gradient, the slope as well as spatial and spectral processing of the satellite imagery as described in, for example: Sabins, F., *Remote Sensing, Principle and Interpretation* (W.H. Freeman & Co, New York. N.Y. 3rd Ed. 1996); Laake, A., et al., "Integrated Approach to 3D Near Surface Characterization in Desert Regions", 26 *First Break* 109-112 (2008); Laake, A., et al., "Geomorphology—Understanding the Near-Surface Impact on Seismic Data", presented at EAGE workshop, 71st EAGE Conference and Exhibition, Amsterdam, The Netherlands, 8-11 (June 2009); and Laake, A., et al., "Discovery of hidden treasures: Surface-subsurface integration reveals faults in Gulf of Suez Oilfields", Schlumberger Reservoir Symposium 2009, Boston (Oct. 20-22, 2009).

Figure 5:
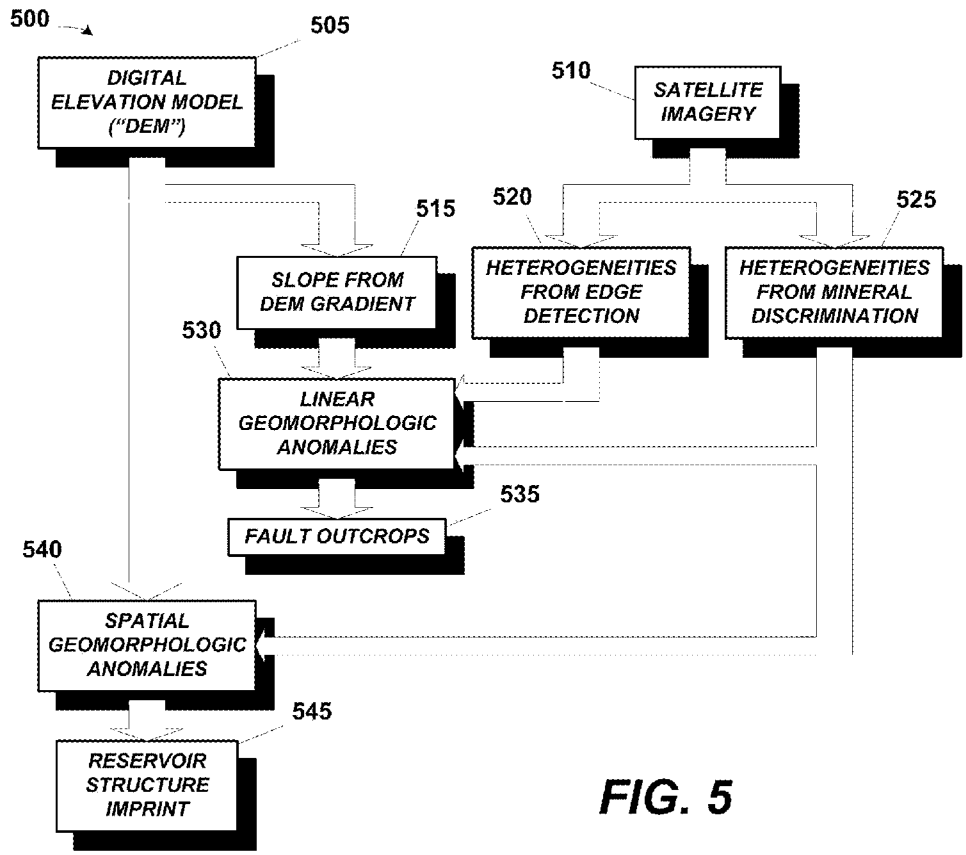
FIG. 5 illustrates one particular workflow for surface geological interpretation from remote sensing data in one particular embodiment of the method in FIG. 1.

Spatial anomalies in the geomorphology are identified as either linear and interpreted as fault outcrops or as spatial and interpreted as possible reservoir structural imprint at the surface. FIG. 5 depicts one particular workflow 500 for surface geological interpretation from remote sensing data. This particular workflow 500 begins with a digital elevation model 505 and a set of satellite imagery 510 for a given geographic area of interest. From the digital elevation model 505, the slope 515 from the digital elevation model gradient is obtained. Heterogeneities from edge detection 520 and from mineral discrimination 525 are derived from the satellite imagery 510.

Linear geomorphologic anomalies 530 are then characterized from the slope 515 and the heterogeneities 520, 525. Fault outcrops 535 are then identified from the linear geomorphologic anomalies 530. Spatial geomorphologic anomalies 540 are characterized from the digital elevation model 505 and the heterogeneities 525 obtained from mineral discrimination. The imprint 545 of the reservoir structure or another subsurface geologic structure is then identified from the spatial geomorphologic anomalies. Thus, from the digital elevation model 505 and the satellite imagery 510 this aspect of the technique identifies the fault outcrops 535 and the reservoir structure imprint 545 in the geographic area of interest.

Figure 6:
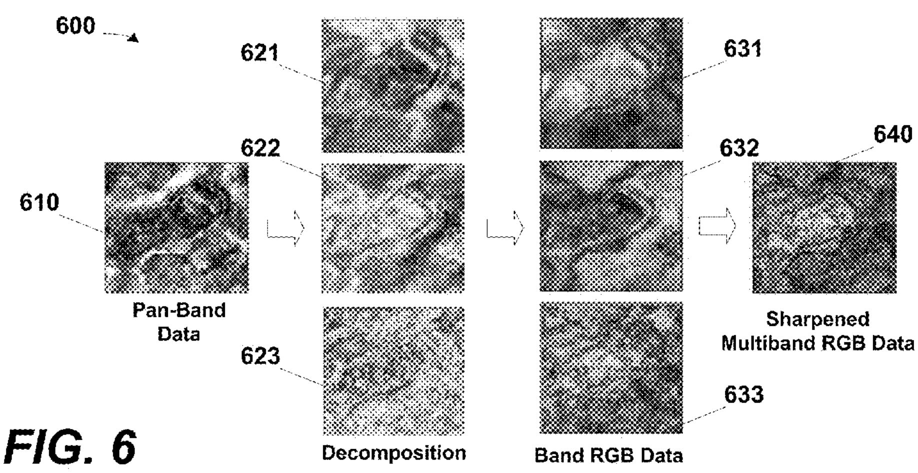
FIG. 6 illustrates a continuous color technique for extracting information out of satellite imagery as applied to seismic data.

One method 600, conceptually illustrated in FIG. 6, for extracting information out of satellite imagery in this manner is the continuous color technique, which generates red-green-blue ("RGB") images. As shown in FIG. 6, the pan-band (broad spectral) data 610 are decomposed into individual spectral bands 621-623 which are then combined to RGB images 631-633. The final product is a sharpened spectrally enhanced image 640.

Figure 7:
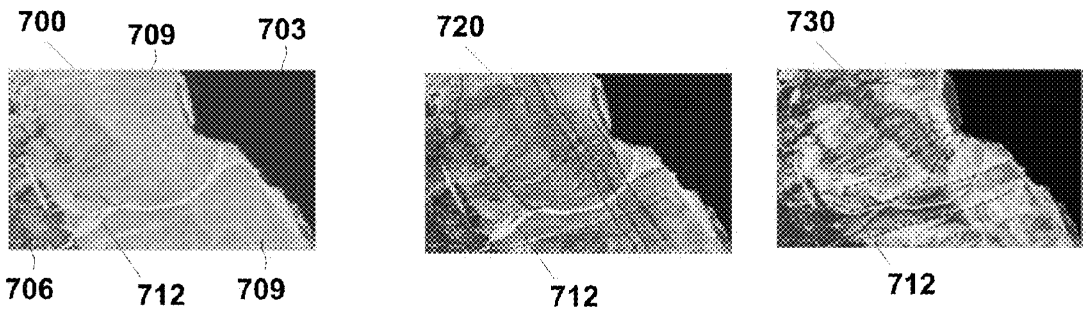
FIG. 7 depicts three images illustrating the variety of information which can be obtained from satellite imagery using different types of processing.

FIG. 7 illustrates the variety of information which can be obtained from satellite imagery using different types of processing. Visible bands are shown in the sample image 700, which shows the sea 703, the mountains 706, and a gravel plain 709 crossed by intermediate streams or wadis 712. The courses of these wadis 712 are affected by shallow tectonics.

In the high discrimination mineral image 720, which results from the difference between two cross-band red-green-blue ("RGB") images (for example, 675-432), subtle changes in the mineral composition of the pebbles deposited by the wadis 712 reveal lineaments and structural features. Wadi courses can also be studied using the band ratio of the pan-chromatic band 8 and the thermal infrared band 6, which detects thermally cooler areas associated with higher moisture contents along the wadi courses, as shown in the image 430. Anomalies in the wadi courses are interpreted as outcrops of faults leading to shifts in the surface geological layers relative to each other.

One suitable technique for extracting structural geologic information from remote sensing data is disclosed and claimed in U.S. patent application Ser. No. 12/568,322, filed Sep. 28, 2009, and incorporated by reference below. However, other suitable techniques may be employed in alternative embodiments.

Turning now to extracting (at 420, FIG. 4) structural geologic information from Rayleigh wave data, Rayleigh waves are one mode of what are known as "surface waves". Surface waves are seismic events propagating without radiation into the Earth's interior, parallel to the surface, with a reduced geometric spreading compared to body waves. Aki & Richards, *Quantitative Seismology* (University Science Books 2002). In land seismic, they carry a large part of the energy radiated by a source at the surface. Richart, F. E., et al., *Vibration of Soil and Foundations* (Prentice-Hall, Englewood Cliffs, N.J. 1969). Traditionally, surface waves are considered a form of "noise" that "contaminates" acquired seismic data. The art has typically, therefore, gone to great lengths to eliminate, or mitigate, their effects upon seismic data.

However, the propagation properties of surface waves depend on the elastic properties of the near surface. Moreover, since the propagation properties are closely related to the near surface elastic parameters, the analysis of surface wave allows the near surface characterization. The presently disclosed technique leverages these facts and employs them to a beneficial end.

The approach used herein consists of the integration of the surface wave method in the general data processing workflow for 3D data. The analysis stage involves creating first a smooth spatial distribution of the propagation properties and then a detailed high-resolution image of the dispersive and dissipative properties of the surface wave modes. These data are inverted, considering a priori information and constraints, and merged in an unique 3D near-surface model. The surface wave results can be used to support refraction statics and shallow velocity model building. The inferred surface wave properties are used to design and optimize the filtering workflow, and can be used for local adaptive filters.

Figure 8:
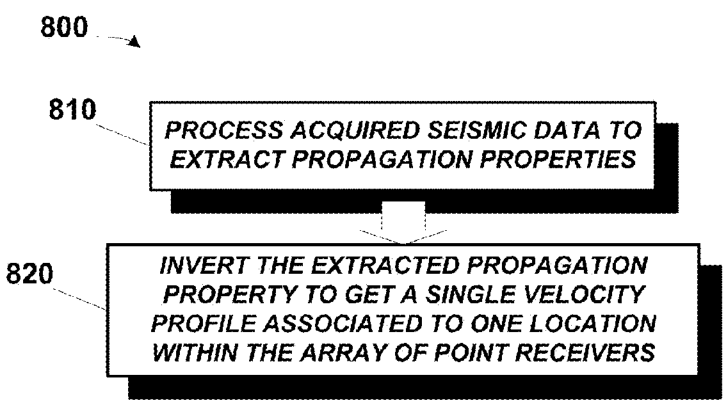
FIG. 8 illustrates a surface wave method for near surface characterization.
Figure 9:
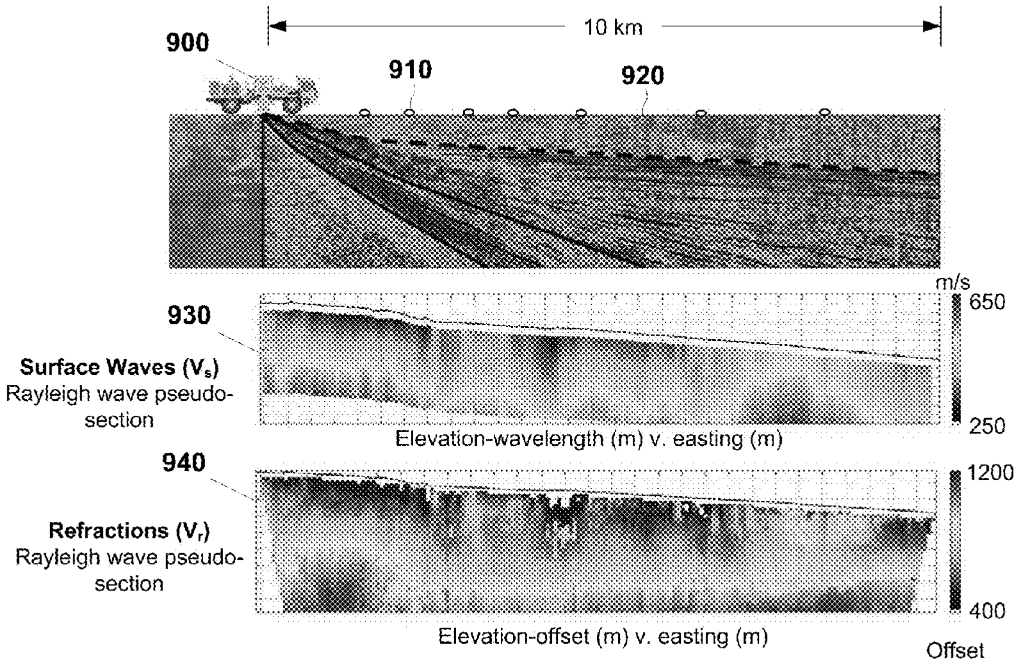
FIG. 9 depicts synthetic Rayleigh wave and short offset refraction pseudo-sections from is an exemplary land-based seismic survey.

The surface wave method of the illustrated embodiment for the near surface characterization is a two step process 800, illustrated in FIG. 8. Seismic data acquired with sources 900 and receivers 910 (only one indicated) at the surface 920, as conceptually depicted in FIG. 9, is processed (at 810) to extract the propagation properties. A distinct way of describing the propagation property is the dispersion curve. The extracted propagation property is then inverted (at 820) to get a single velocity profile associated to one location within the array of point receivers.

The dispersion curve is extracted tracking energy maxima in 2D wavefield transforms, in which the energy is mapped from the T-X domain into the F-K domain. The spatial distribution of the surface wave velocity can be plotted as a pseudo section 930. The pseudo section 930 is a 2D image of the properties in which the horizontal axis represents the position along a line of receivers (or sources) and the vertical axis represent a propagation parameter related to the depth. The wavelength can be used for this purpose.

One suitable technique for extracting structural geological information from Rayleigh wave data is disclosed and claimed in U.S. patent application Ser. No. 12/620,941, filed Sep. 18, 2009, and incorporated by reference below. However, other suitable techniques may be employed in alternative embodiments.

Turning now to extracting (at 430, FIG. 4) structural geologic information from short offset refraction data, point receiver seismic data allowed automatic first break picking on short offset refractions using rayparameter interferometry. Ferber, R., et al., "Interferometric rayparameter estimation and applications," EAGE Conference, Amsterdam, Holland, paper V001 (Jun. 8-11, 2009). Typically first breaks are picked on much larger offsets usually on deeper refractors. Interferometry enabled us to pick refractions on an offset range from −600 to +600 m. To perform effective first break picking the rayparameter is used in the data pre-conditioning step prior to first break picking The time shifts are computed using rayparameter estimates instead of those computed from the cross-correlation functions. With this method refractions travelling along horizons of less than 100 m depth we can map these horizons as well as the local P-wave velocities. A velocity pseudo-section 940 from short offset refractions is shown in FIG. 9.

One suitable technique for extracting structural geological information from short offset refractions is disclosed and claimed in U.S. patent application Ser. No. 11/960,176, filed Dec. 19, 2007, and incorporated by reference below. However, other suitable techniques may be employed in alternative embodiments.

Figure 10:
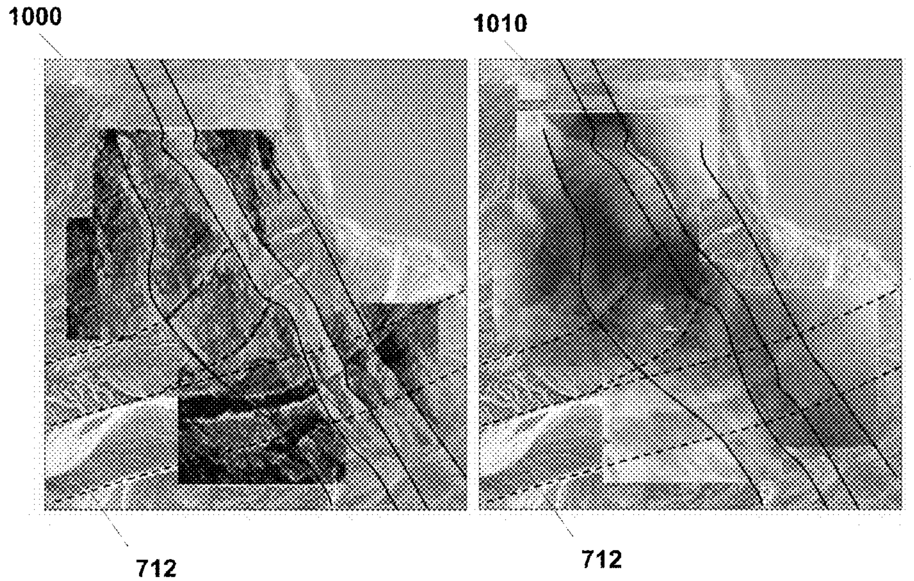
FIG. 10 depicts Rayleigh wave and short offset refraction elastic heterogeneity maps at 100 m depth which reveal near-surface faults.

The illustrated embodiment extends the elastic mapping from Rayleigh waves and short offset refractions into 3D. The results are shown as RGB maps 1000, 1010 in FIG. 10. These images 1000, 1010 are of the same geographic area as the images 700, 720, 730 of FIG. 7. In the image 1000, the Rayleigh wave velocity maps for three wavelengths provide a clear image of shallow fault zones (light zones). The location of these fault zones matches the fault zones mapped from the satellite imagery, as shown in FIG. 7, and the refraction RGB image 1010. The image 1010 combines weathering layer depth, velocity and receiver static corrections. Note, however, that neither Rayleigh waves nor refractions map the faults bordering the wadi 712, which are revealed by the lithology from satellite imagery as shown in FIG. 7 and discussed above.

The joint interpretation of remote sensing data and shallow seismic data from short offset refractions and Rayleigh waves is directed towards two principal targets: lineaments, which represent fault zones, and areal structures, which represent the shallow geological structure, which in turn may yield some correlation with the reservoir structure. The workflow for both targets starts with the analysis of the remote sensing data, because they provide dense spatial coverage at higher resolution than the seismic data. The analysis of the remote sensing data establishes possible anomalies which are validated by the results from the shallow seismic data.

One suitable technique for joint interpretation of data suitable for use with the present invention is disclosed and claimed in U.S. patent application Ser. No. 12/124,218, filed May 21, 2008, and incorporated by reference below. However, other suitable techniques may be employed in alternative embodiments.

Figure 11:
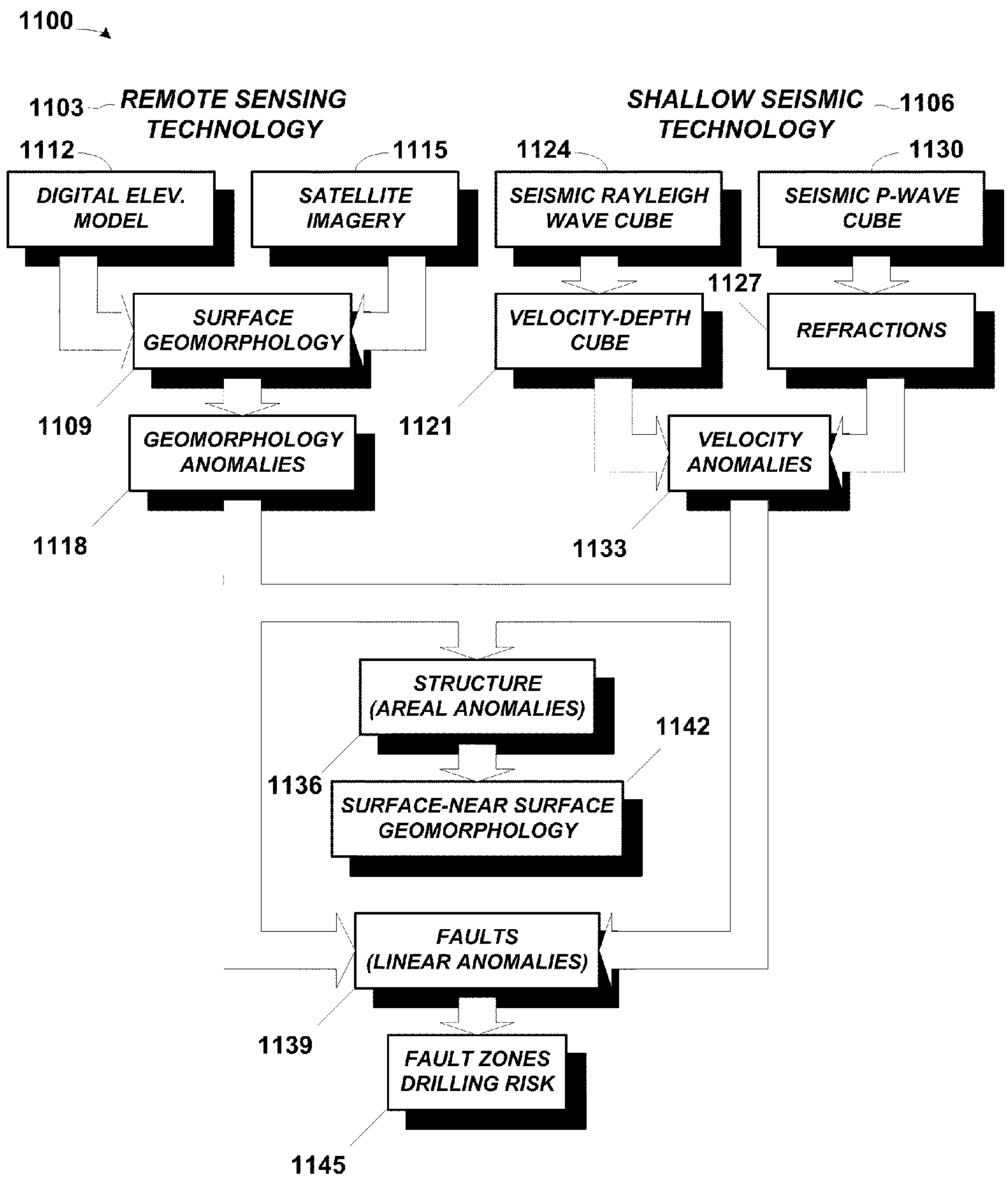
FIG. 11 illustrates one particular workflow for joint geological interpretation of Rayleigh wave and remote sensing data.

Thus, the illustrated embodiment of the presently disclose technique is broadly illustrated in FIG. 11, which depicts a workflow 1100 for joint geological interpretation of Rayleigh wave and remote sensing data that employs remote sensing technology (at 1103) and shallow seismic technology (at 1106). On the remote sensing technology (at 1103) side, a surface geomorphology (at 1109) is determined from a digital elevation model (at 1112) and satellite imagery (at 1115), from which geomorphology anomalies (at 1118) are identified. On the shallow seismic technology (at 1106) side, a velocity-depth cube (at 1121) is determined from a seismic Rayleigh wave cube (at 1124) and a set of refractions (at 1127) are determined from a seismic P-wave cube (at 1130). A set of velocity anomalies (at 1133) is then determined from the velocity-depth cube (at 1121) and the refractions (at 1127).

From the geomorphology anomalies (at 1118) and the velocity anomalies (at 1133), the workflow (at 1100 identifies the structure (at 1136), or areal anomalies, and the faults (at 1139), or linear anomalies. The surface-near surface geomorphology (at 1142) as then determined from the structure (at 1136) and the fault zone drilling risk (at 1145) from the faults (at 1139). This information can be used in a variety of ways, some of which will now be discussed.

Figure 14:
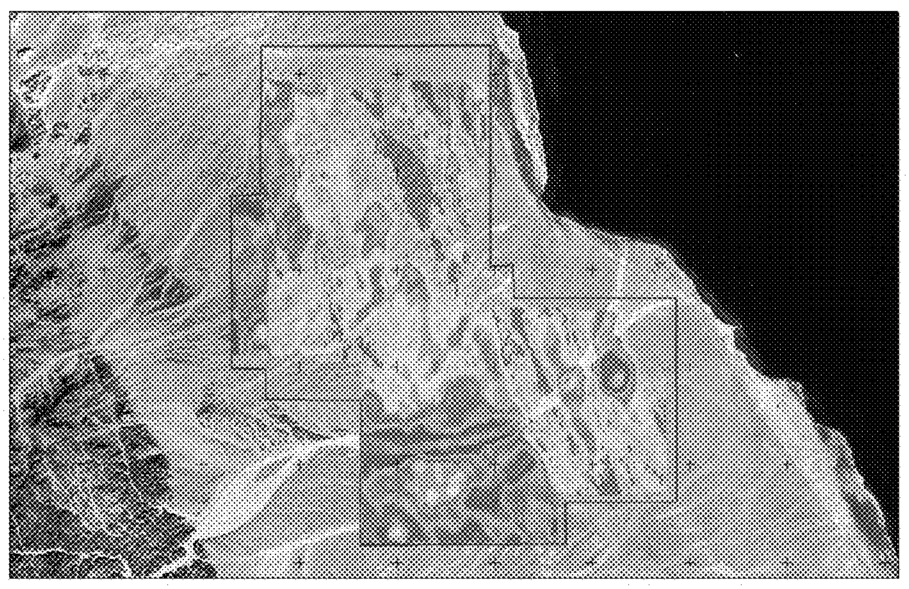
FIG. 14 is an image comprising an exemplary drilling risk and near-surface geological structure map.
Figure 12:
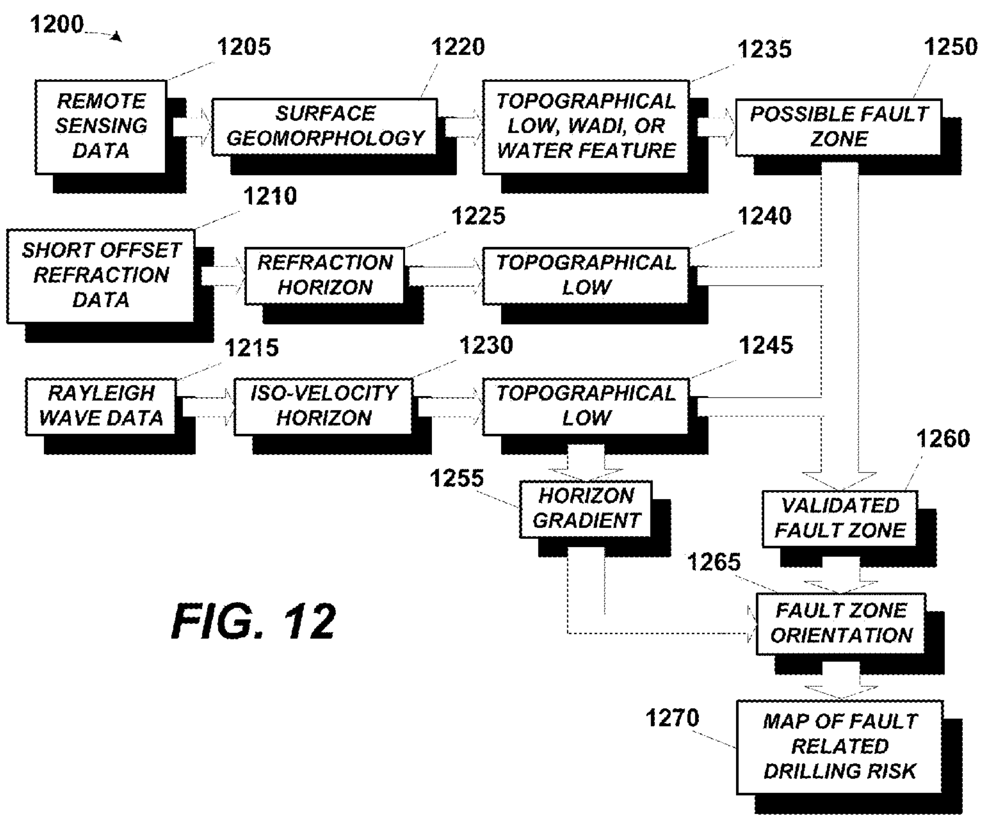
FIG. 12 illustrates a workflow for integrated mapping of shallow faults and the related drilling risk.
Figure 13:
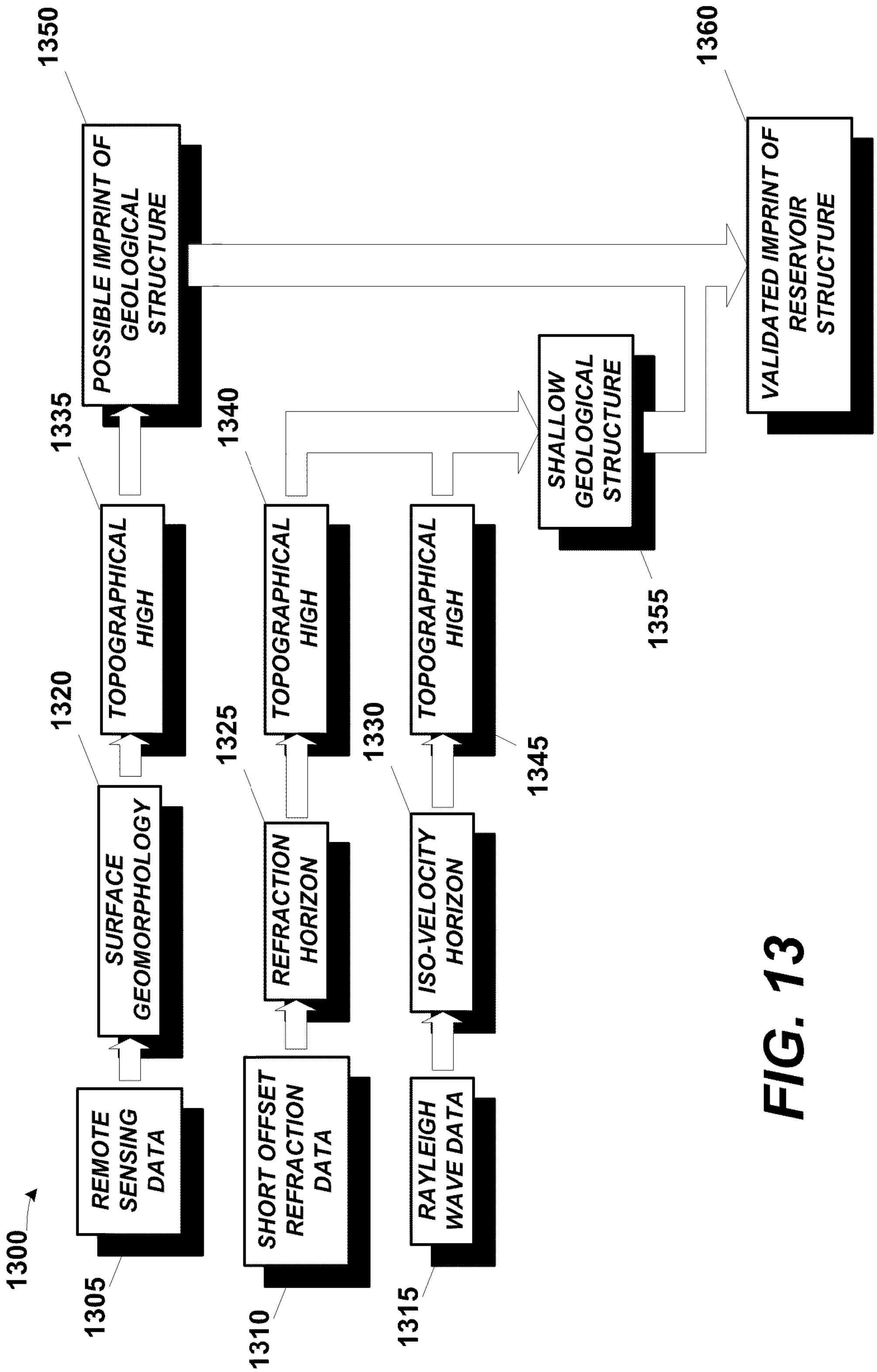
FIG. 13 illustrates a workflow for mapping of shallow geological structure.

Those in the art having the benefit of this disclosure will appreciate that the presently disclosed technique will have a number of valuable applications in the interpretation of seismic data with respect to near-surface formations. Two such are illustrated below. First, FIG. 12 depicts the workflow for fault zone and drilling risk mapping. Next, FIG. 13 depicts the workflow for shallow geology mapping. The final result may also be represented as a map showing the drilling risk and the near-surface geomorphology as a subsurface topographic map overlaid on a satellite map. FIG. 14 is an image rendered for human perception from such a map.

FIG. 12 depicts one particular workflow 1200 for fault zone and drilling risk mapping. The workflow 1200 begins with remote sensing data 1205, short offset refraction data 1210, and Rayleigh wave data 1215. From these three, complementary data sets, the surface geomorphology 1220, refraction horizon 1225, and iso-velocity horizon 1230, respectively, are derived. In turn, the topographical lows 1235, 1240, 1245 are located from the surface geomorphology 1220, refraction horizon 1225, and iso-velocity horizon 1230, respectively. Possible fault zones 1250 are identified from the topographical lows 1235 located from the surface geomorphology 1220. A horizon gradient 1255 is determined from the topographical lows 1245 located from the iso-velocity horizon 1230.

A validated fault zone 1260 is then located using the possible fault zone 1250 and the topographical lows 1240, 1245 obtained from the refraction horizon 1225 and the iso-velocity horizon 1230, respectively. The horizon gradient 1255, in conjunction with the validated fault zone 1260, is then used to determine a fault zone orientation 1265, from which a map 1270 of fault related drilling risk can be developed.

Turning now to FIG. 13, a workflow 1300 for the shallow geology mapping also begins with remote sensing data 1305, short offset refraction data 1310, and Rayleigh wave data 1315. From these three, complementary data sets, the surface geomorphology 1320, refraction horizon 1325, and iso-velocity horizon 1330, respectively, are derived. However, instead of topographical lows, the workflow 800 locates the topographical highs 1335, 1340, 1345 from the surface geomorphology 1320, refraction horizon 1325, and iso-velocity horizon 1330, respectively.

A possible imprint 1350 is then identified from the topographical high 1335 in the surface geomorphology 1320. A shallow geological structure 1355 is then developed from the topographical highs 1340, 1335 derived from the refraction horizon 1325 and iso-velocity horizon 1330, respectively. Finally, a validated imprint 1360 is obtained from the possible imprint 1305, and the shallow geological structure 1355.

FIG. 14 is an image rendered for human perception from a map showing the drilling risk and the near-surface geomorphology as a subsurface topographic map overlaid on a satellite map. That is, this image portrays the combined outputs of the workflow 1200 in FIG. 12 and the workflow 1300 in FIG. 13. Still other end uses and applications of the presently disclosed technique may become apparent to those skilled in the art having the benefit of this disclosure.

The above description contemplates that the data has previously been acquired, although the invention is not so limited. The remotely sensed data in the illustrated embodiment is satellite imagery. Such satellite imagery is widely available from both private and governmental sources. The seismic data in the illustrated embodiments is point receiver seismic data, i.e., seismic data collected using point receiver technology. One technology suitable for such acquisition is the Q-Technology® available from WesternGeco, LLC, the assignee hereof. Note, however, that the invention is so limited. Other types of seismic data, such as seismic data acquired using arrays, may be used in alternative embodiments.

With the technology integration proposed herein, it is shown for the first time that near-surface structural geological imaging can be achieved, which allows drawing near-surface drilling risk maps. One can generate a near-surface elastic model to assist data processing. Furthermore, one can apply this technique to separately generate geological and drilling services. This integration yields a process that directly provides a geological result rather than simply improving the seismic data as is the case in conventional practice.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Furthermore, the phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them-—i.e., when there is no power or when they are powered but not in operation.

The following are hereby incorporated by reference for the purposes discussed above as if expressly set forth verbatim herein:

U.S. Provisional Patent Application Ser. No. 61/104,980, entitled "Generation of Logistic and Data Quality Risk Maps from Remote Sensing Based Geomorphohlogic Analysis of the Earth", and filed Oct. 13, 2008, in the name of the inventor Andreas W. Laake, and commonly assigned herewith;

U.S. Provisional Patent Application Ser. No. 61/104,977, entitled "Statics Correction Estimation from Remote Sensing Data", and filed Oct. 13, 2008, in the name of the inventor Andreas W. Laake, and commonly assigned herewith;

U.S. Provisional Patent Application Ser. No. 61/104,582, entitled "Reconstruction of a Pre-Erosion Surface", and filed Oct. 10, 2008, in the name of the inventor Andreas W. Laake, and commonly assigned herewith;

U.S. patent application Ser. No. 12/568,322, entitled, "Near-Surface Geomorphologic Characterization Based on Remote Sensing Data", and filed Sep. 28, 2009, in the name of the inventor Andreas Laake, and commonly assigned herewith;

U.S. Provisional Patent Application Ser. No. 61/118,317, entitled "Continuous Surface Wave Analysis in 3D Data", filed Nov. 26, 2008, in the name of the inventors Claudio L. Strobbia and Anna Glushchenko, and commonly assigned herewith;

U.S. patent application Ser. No. 12/620,941, entitled "Continuous Adaptive Surface Wave Analysis for Three-Dimensional Seismic Data", filed Sep. 18, 2009, in the name of the inventors Claudio L. Strobia and Anna Glushchenko, and commonly assigned herewith;

U.S. Provisional Patent Application Ser. No. 60/940,023, entitled "3D Hybrid Modeling of Near-Surface Elastic Properties", filed May 24, 2007, in the name of the inventors Andreas W. Laake et al., and commonly assigned herewith;

U.S. patent application Ser. No. 12/124,218, entitled, "Near-Surface Layer Modeling", and filed May 21, 2008, in the name of the inventors Andreas W. Laake et al., and commonly assigned herewith;

U.S. patent application Ser. No. 11/960,176, entitled "Method to Estimate Ray Parameter for Seismograms", filed Dec. 19, 2007, in the name of the inventors Ralf Ferber and Larry Velasco, and published Jun. 25, 2009, as U.S. Patent Publication 2009/0161488, and commonly assigned herewith;

Ferber, R., et al., "Interferometric rayparameter estimation and applications," EAGE Conference, Amsterdam, Holland, paper V001 (Jun. 8-11, 2009);

Huggett, R. J., *Fundamentals of Geomorphology* (2nd ed., Routledge Fundamentals of Physical Geography, Routledge, London 2007);

Laake, A. and Insley, M., "Applications of Satellite Imagery to Seismic Survey Design," *The Leading Edge* 1062-1064 (October 2004);

Laake, A., Al-Alawi, H. & Gras, R., "Integration of Remote Sensing Data with Geology and Geophysics—Case Study from Bahrain", GEO (2006).

Laake, A., & Cutts, A., "The Role of Remote Sensing Data in Near-Surface Seismic Characterization", 25(2) *First Break* 51-55 (2007);

Laake, A., et al., "Integrated Approach to 3D Near Surface Characterization in Desert Regions", 26 *First Break* 109-112 (2008);

Laake, A., et al., "Geomorphology—Understanding the Near-Surface Impact on Seismic Data", presented at EAGE workshop, 71st EAGE Conference and Exhibition, Amsterdam, The Netherlands, 8-11 (June 2009);

Laake, A., et al., "Discovery of hidden treasures: Surface-subsurface integration reveals faults in Gulf of Suez Oilfields", Schlumberger Reservoir Symposium 2009, Boston (Oct. 20-22, 2009);

Short, N. M. Sr., and R. W. Jr. Blair (eds.), [1986] Geomorphology from Space, NASA 1986. URL: http://geoinfo.amu.edu.pl/wpk/geos/GEO_COMPLETE_TOC_html [19/09/2007].

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

jointly interpreting, by a computer, a plurality of complementary data sets describing different attributes of a near-surface geologic structure, wherein the complementary data sets comprise a set of remotely sensed data, a set of short offset refraction data, and a set of seismic surface wave data for the structure, wherein the set of short offset refraction data comprises data measured by at least one receiver that is spaced apart from at least one source by an offset in an offset range from −600 meters to +600 meters; and ascertaining, by the computer, a near-surface geomorphology from the joint interpretation.

2. The method of claim 1, further comprising mapping shallow geological structures from the near-surface geomorphology.

3. The method of claim 2, wherein the shallow geological structures comprise shallow faults.

4. The method of claim 1, further comprising mapping drilling risk from the near-surface geomorphology.

5. The method of claim 1, wherein the set of seismic surface wave data comprises a set of Rayleigh wave data.

6. The method of claim 1, wherein jointly interpreting the plurality of complementary data sets includes:

extracting geophysical characteristics of the near-surface geologic structure from the set of remotely sensed data, the set of short offset refraction data, and the set of seismic surface wave data, the sets yielding corresponding different geophysical characteristics; and identifying topographical extremes in the near-surface geologic structure in the set of remotely sensed data, the set of short offset refraction data, and the set of seismic surface wave data.

7. The method of claim 6, wherein ascertaining the near-surface geomorphology includes locating a geophysical feature of the near-surface geologic structure from the extracted geophysical characteristics and the identified topographical extremes.

8. The method of claim 1, further comprising identifying an anomaly using the ascertained near-surface geomorphology, the anomaly at least one selected from the group consisting of a lineament and an imprint of a subsurface geologic structure.

9. A non-transitory storage medium encoded with instructions that, when executed by a computing device, perform a method comprising:

jointly interpreting a plurality of complementary data sets describing different attributes of a near-surface geologic structure, wherein the complementary data sets comprise a set of remotely sensed data, a set of short offset refraction data, and a set of seismic surface wave data for the structure, wherein the set of short offset refraction data comprises data measured by at least one receiver that is spaced apart from at least one source by an offset in an offset range from −600 meters to +600 meters; and ascertaining a near-surface geomorphology from the joint interpretation.

10. The storage medium of claim 9, wherein the instructions are executed to further perform mapping shallow geological structures from the near-surface geomorphology.

11. The storage medium of claim 9, wherein the instructions are executed to further perform mapping drilling risk from the near-surface geomorphology.

12. The storage medium of claim 9, wherein the set of seismic surface wave data comprises a set of Rayleigh wave data for that structure.

13. The storage medium of claim 9, wherein jointly interpreting the plurality of complementary data sets includes:

extracting geophysical characteristics of the near-surface geologic structure from the set of remotely sensed data, the set of short offset refraction data, and the set of seismic surface wave data, the sets yielding corresponding different geophysical characteristics;

identifying topographical extremes in the near-surface geologic structure in the set of remotely sensed data, the set of short offset refraction data, and the set of seismic surface wave data; and locating a geophysical feature of the near-surface geologic structure from the extracted geophysical characteristics and the identified topographical extremes.

14. The storage medium of claim 9, wherein jointly interpreting the plurality of complementary data sets includes:

extracting geophysical characteristics of the near-surface geologic structure from the set of remotely sensed data, the set of short offset refraction data, and the set of seismic surface wave data, the sets yielding corresponding different geophysical characteristics; and identifying topographical extremes in the near-surface geologic structure in the set of remotely sensed data, the set of short offset refraction data, and the set of seismic surface wave data.

15. A computing apparatus, comprising:

at least one processor;

a storage; and instructions stored on the storage that, when executed by the at least one processor, perform:

jointly interpreting a plurality of complementary data sets describing different attributes of a near-surface geologic structure, wherein the complementary data sets comprise a set of remotely sensed data, a set of short offset refraction data, and a set of seismic surface wave data for the structure, wherein the set of short offset refraction data comprises data measured by at least one receiver that is spaced apart from at least one source by an offset in an offset range from −600 meters to +600 meters; and ascertaining a near-surface geomorphology from the joint interpretation.

16. The computing apparatus of claim 15, wherein the set of seismic surface wave data comprises a set of Rayleigh wave data.

17. The computing apparatus of claim 15, wherein jointly interpreting the plurality of complementary data sets includes:

extracting geophysical characteristics of the near-surface geologic structure from the set of remotely sensed data, the set of short offset refraction data, and the set of seismic surface wave data, the sets yielding corresponding different geophysical characteristics;

identifying topographical extremes in the near-surface geologic structure in the set of remotely sensed data, the set of short offset refraction data, and the set of seismic surface wave data; and locating a geophysical feature of the near-surface geologic structure from the extracted geophysical characteristics and the identified topographical extremes.

* * * * *